(12) United States Patent
Coppin

(10) Patent No.: US 6,456,116 B1
(45) Date of Patent: Sep. 24, 2002

(54) DYNAMIC COMPARATOR CIRCUIT

(75) Inventor: Justin Allan Coppin, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/834,030

(22) Filed: Apr. 11, 2001

(51) Int. Cl.$^7$ .................................. H03K 19/096
(52) U.S. Cl. ..................... 326/95; 376/98; 376/54; 376/55
(58) Field of Search .................. 326/93–98, 52–55; 340/146.2

(56) References Cited

U.S. PATENT DOCUMENTS

| | | | | |
|---|---|---|---|---|
| 5,872,467 A | * | 2/1999 | Huang | 327/63 |
| 5,881,076 A | * | 3/1999 | Murray | 371/49.1 |
| 5,910,762 A | * | 6/1999 | Kurotsu | 340/146.2 |

* cited by examiner

Primary Examiner—Michael Tokar
Assistant Examiner—Anh Q. Tran

(57) ABSTRACT

In one embodiment, the present invention provides a multi-bit dynamic comparator for comparing first and second words having a plurality of comparative bit pairs with each pair having comparative first and second word bits. The multi-bit comparator includes a multiple number of precharge sub-stage comparators operably connected to a precharge NOR circuit. The multiple number of precharge sub-stage comparators each have inputs for receiving one or more separate comparative bit pairs. They each also have an output for providing a sub-stage output value that is inactive during a precharge state, active during an evaluate state if any of its received one or more comparative bit pairs has unequal bits, and inactive during the evaluate state if all of its received comparative bit pairs have equivalent bits. The multiple number of received separate one or more bit pairs constitutes the plurality of comparative bit pairs. Thus, all of the sub-stage comparators output the inactive value during the evaluate state when the first and second words are equal.

27 Claims, 2 Drawing Sheets

DYNAMIC COMPARATOR CIRCUIT

BACKGROUND

Dynamic devices are logic circuits that generate an output depending upon a predetermined combination of inputs for implementing a logical function. One common use for dynamic devices is for comparators. A comparator will output a unique signal only if two input words (each containing multiple data bits) are identical to one another.

Dynamic devices are characterized by two states, precharge and evaluate. In the precharge state, a storage node is charged to a known or predetermined voltage level. In the evaluate state, an array or "tree" of pull-down transistors configured in a basic logical function (e.g., NAND, NOR, or combination thereof) is given the opportunity to discharge the node to a second known or predetermined voltage level or to allow the charge to persist. The logical function input signals are connected, typically, to the gates of one or more of the transistors in the logical section tree. The final charge on the node may thereby be controlled by the particular values of the inputs. The final voltage at the node, high or low, serves as the device's output, which may additionally be buffered and, perhaps, inverted.

Two basic logical section structures include stacked NAND and parallel NOR structures. In a stacked NAND logical section, two or more transistors are stacked in series with one another and to the precharge node. The precharged node is discharged if and only if all of the transistor gate inputs are active (e.g., high). With the parallel NOR configuration, two or more transistors are arranged in parallel with one another and across the precharged node. If any of the transistor gate inputs are active, the precharge node is discharged. In other words, the precharged node remains charged if and only if all of the transistor gate inputs are not activated. Of course, with the use of inverted or non-inverted inputs, any logical function may be implemented with either structure.

FIGS. 1A and 1B show a conventional multi-bit (33 bit) dynamic comparator circuit 105. Comparator circuit 105 is used for comparing two 33 bit words (A and B) with one another. Circuit 105 includes an 11 input OR gate 110 and eleven 3-bit dynamic comparator circuits C1–C11. Each of these comparators, C1–C11, compares a separate 3-bit portion of the two (A, B) input words. The output from each comparator, C1–C11, is connected to one of the eleven OR gate inputs and provides to it a low value if and only if its received 3 bit A, B input word portions are equal to one another. Thus, if all of the 3 bit A, B word portions are equal to one another, then every output from C1–C11 will be low thereby causing OR gate 110 to output a low, as well, indicating that words A and B are equal to one another.

With reference to FIG. 1A, 3-bit dynamic comparator circuit 100 is depicted. Circuit 100 corresponds to the C1 (bits 0, 1, 2) comparator from the 33-bit comparator circuit 105 of FIG. 1B. (Equivalent circuits are used for implementing the other comparators, C2–C11.) Circuit 100 includes NFET transistors, Q1–Q18, PFET transistors, Q19–Q20, and inverter U1. Comparator circuit 100 has a precharge storage node, S0, and an output at Z. Q19 serves as a precharge transistor and cooperates with Q3, Q6, Q9, Q10, Q15, and Q18, which are DNG transistors, for charging the storage node, S0, during a precharge state. Pull-down transistors, Q1, Q2, Q4, Q5, Q7, Q8, Q12, Q11, Q13, Q14, Q16, and Q17, are configured in a combination NAND stack and parallel NOR tree structure for implementing an XOR operation on each pair of received input bits (e.g., $A_0/B_0$) to be compared. If any input bit pair has unequal bits, then one of its associated NAND stacks discharges the storage node, S0, during the evaluate state. Inverter U1 together with PFET transistor, Q20, serves as a bolder circuit for "holding" the storage node charged during the evaluate state if it is suppose to evaluate high. It also inverts the storage node value and provides the inverted value at the output Z. In operation, during a precharge state (i.e., clock is low for this configuration), storage node, S0, charges to a high level with Q19 turned on and an DNG transistors, Q3, Q6, Q9, Q10, Q15 and Q18, turned off. If all of the A, B bit pairs have equivalent bits, then none of the pull-down stacks will turn on during the evaluate state (clock high), and the storage node, S0, stays high. Conversely, if any A, B bit pair has unequal bits, then at least one of the six pull-down stacks will turn on (i.e., both of its transistors are activated), and the storage node, S0, discharges to a low value during the evaluate state. Therefore, if the A bits are equal to their corresponding B bits, then S0 evaluates high and if they are not equal, it evaluates low.

Unfortunately, there are several problems associated with this conventional configuration. To begin with, the pull-down transistor NAND stacks add substantial capacitance to the storage node, S0, which increases the time required for it to precharge, as well as evaluate, thereby slowing down the overall speed of the multi-bit comparator. In addition, the trace or wire lengths from the outputs of the 3-bit comparators to the OR gate inputs are excessively long, especially for the outwardly distributed comparators (e.g., C1, C2, C10, C11). These excessive lengths impart substantial propagation delay, which also ads to the precharge time required for the multi-bit comparator. Thus, it can be seen that in order to increase the operating frequencies, and thus the operational performance, of dynamic comparators, their associated precharge times must be reduced.

SUMMARY OF THE INVENTION

The comparator circuit is operative on one or more devices where the devices receive multiple word bit values. The devices provide outputs indicative of whether the received word bits are equal to one another. A precharge circuit using parallel pull-down transistors connected to a common storage node where each such transistor has an input coupled to the output of associated devices for receiving a XOR value. The storage node is discharged if the word bits are not equal and is charged where the word bits are equal.

DETAILED DESCRIPTION

Figure 1A:
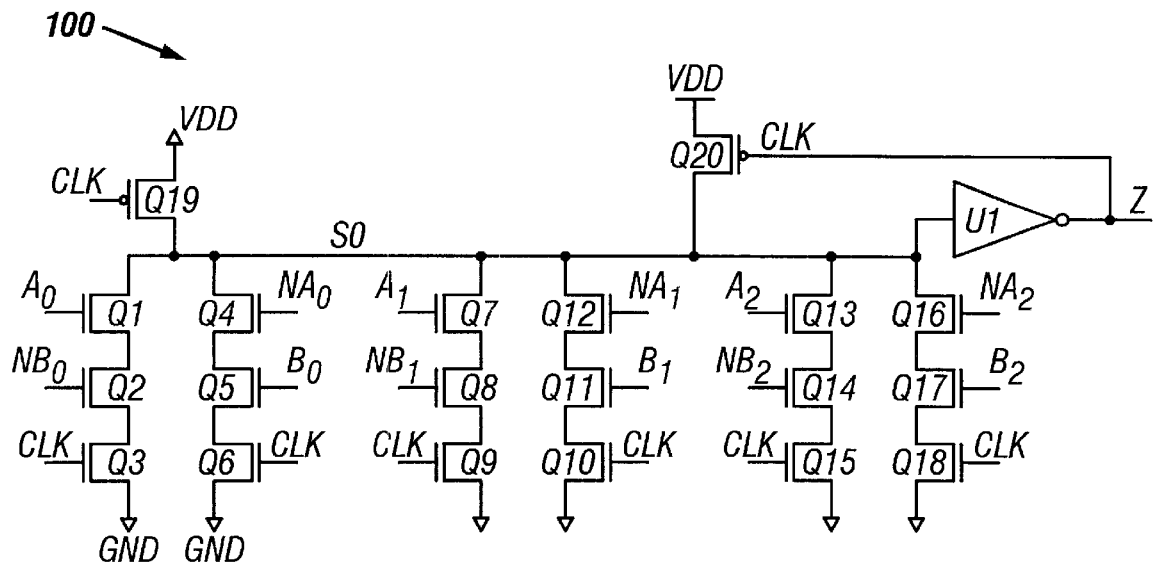
FIG. 1A is a prior art circuit diagram of a conventional 3-bit, dynamic comparator.
Figure 1B:
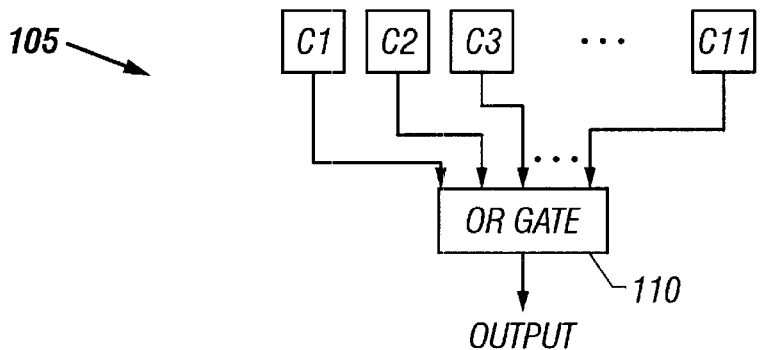
FIG. 1B is a prior art circuit diagram of a conventional multi-bit, dynamic comparator that incorporates the comparator of FIG. 1A.

The present invention generally provides improved dynamic comparator circuit configurations. In one embodiment, the circuit provides a several-bit dynamic comparator that can be used alone or in combination with other several-bit dynamic comparators as sub-stage comparators for a multi-bit dynamic comparator, which is also taught by the present invention. The several and multi bit comparators incorporate novel features that allow them to precharge and evaluate in less time than conventional designs.

In one embodiment, a dynamic comparator circuit is provided for comparing first and second words having one or more comparative bit pairs. The circuit includes one or more XOR devices operably connected to a precharge NOR circuit. The one or more XOR devices each have inputs for receiving first and second word bit values from a separate one of the one or more comparative bit pairs, and an output that provides an XOR value. The XOR value indicates whether the received first and second word bits are equal to one another. The precharge NOR circuit has one or more substantially parallel pull-down transistors connected to a common storage node. Each of the pull-down transistors has an input coupled to the output of an associated separate one of the one or more XOR devices for receiving its XOR output value and discharging the storage node if the first and second word bits input to its associated XOR device are not equal to each other. Accordingly, the storage node evaluates to a charged value when all of the one or more comparative bit pairs have equivalent bits thereby indicating that the first and second words are equal to one another. With this configuration, the use of NAND stacks is avoided thereby reducing storage node capacitance and significantly increasing the precharge speed of the comparator.

In another embodiment, the present invention provides a multi-bit dynamic comparator for comparing first and second words having a plurality of comparative bit pairs with each pair having comparative first and second word bits. The multi-bit comparator includes a multiple number of precharge sub-stage comparators operably connected to a precharge NOR circuit. The multiple number of precharge sub-stage comparators each have inputs for receiving one or more separate comparative bit pairs. They each also have an output for providing a sub-stage output value that is inactive during a precharge state, active during an evaluate state if any of its received one or more comparative bit pairs has unequal bits, and inactive during the evaluate state if all of its received comparative bit pairs have equivalent bits. The multiple number of received separate one or more bit pairs constitutes the plurality of comparative bit pairs. Thus, all of the sub-stage comparators output the inactive value during the evaluate state when the first and second words are equal. The precharge NOR circuit has the multiple number of substantially parallel pull-down transistors connected to a common multi-bit comparator storage node. Each of the pull-down transistors has an input coupled to the output of an associated separate one of the multiple number of sub-stage comparators for receiving its sub-stage output value. The multi-bit comparator storage node charges to a precharge level during a precharge state, discharges during the evaluate state if any of the sub-stage output values are active during the evaluate state, and remains operably charged to the precharge level during the evaluate state if all of the sub-stage output values remain inactive during the evaluate state. Accordingly, the multi-bit storage node indicates that the first and second words are equal if it evaluates to a charged level. The multi-bit comparator storage node includes a longitudinal conductive member. The multiple number of pull-down transistors are each substantially uniformly distributed along the conductive member with each transistor being proximal to its associated sub-stage comparator. In this way, trace lengths from the sub-stage comparators to the NOR circuit inputs are substantially reduced, which decreases the precharge time required for the multi-bit comparator.

As used herein, the term "several-bit" refers to one or more and typically between two to eight bits. Likewise, the term "multi-bit" generally refers to a relatively large number of bits such as eight or more. A several-bit dynamic comparator compares one or more (e.g., 3) comparative bit pairs from first and second (or comparative portions of first and second) words that are to be compared with one another, and it outputs a value that indicates whether all of its received comparative bit pairs have equivalent bits. A comparative bit pair is a pair of corresponding bits from first and second words that are to be compared. For example, when a first 8 bit word having bits 0 through 7 is compared with a second 8 bit word having bits 0 through 7, the "0" bits from the first and second words would constitute a comparative bit pair. Likewise, the "1" bits, the "2" bits and so on through the "7" bits would each constitute a comparative bit pair from the first and second words. The first and second words would be equal if and only if each of the eight comparative bit pairs all have equivalent bits. A "word" may consist of any number of bits (e.g., 4, 8, 12, 24, 33, 64). Moreover, a word may be complete upon itself, or it may constitute a portion of another word such as when a portion of a register is to be compared with another portion of a separate register.

A multi-bit dynamic comparator generally includes a multiple number of sub-stage dynamic comparators. The multi-bit comparator has a multi-bit storage node that stays charged during an evaluate state if the first and second words to be compared are equal and discharges if the words are not equal. If a several-bit dynamic comparator is used as a sub-stage dynamic comparator for a multi-bit dynamic comparator, its output provides an active value for discharging the multi-bit storage node if any of its comparative bit pairs has unequal bits and outputs an inactive value, which will not discharge the storage node when all of its comparative bit pairs have equivalent bits. Thus, if the multi-bit storage node remains charged during an evaluate state, it is indicating that all of the sub-stage comparators are outputting inactive values. In turn, this means that all of the comparative bit pairs have equal bits, which means that the first and second words are equivalent to one another.

Figure 2:
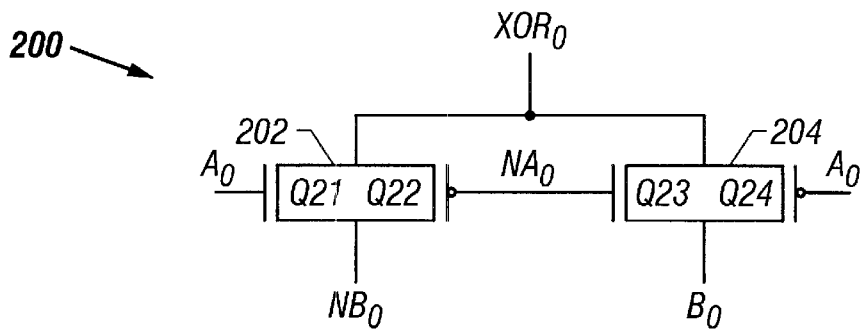
FIG. 2 is a circuit diagram of one embodiment of an asynchronous XOR device of the present invention.
Figure 3:
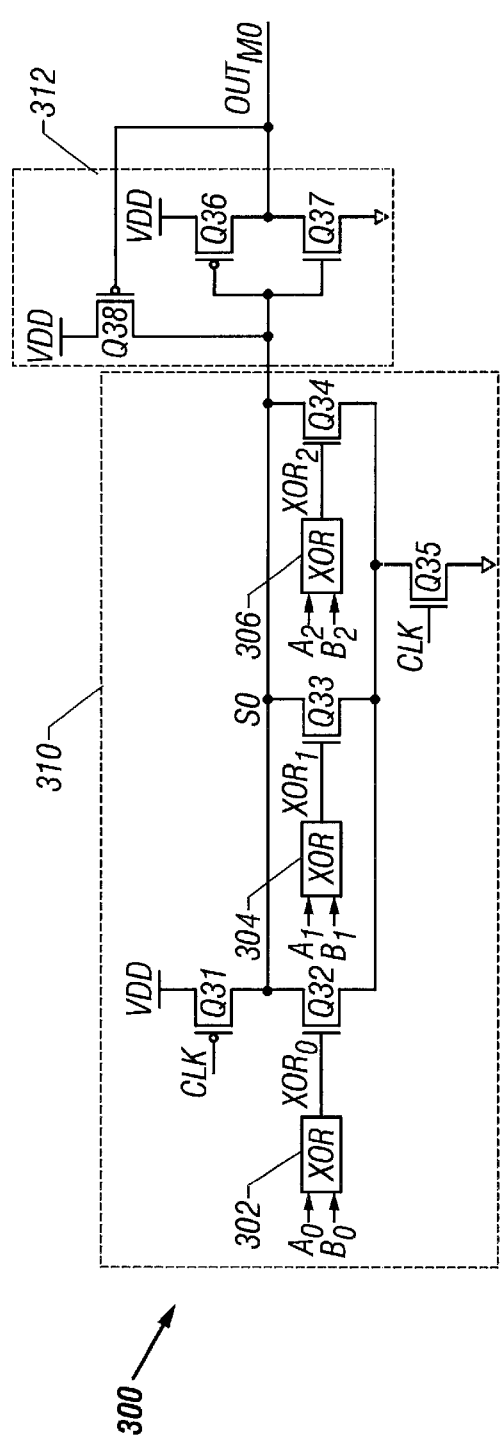
FIG. 3 is a circuit diagram of one embodiment of a several-bit dynamic comparator of the present invention.

With reference to FIGS. 2 and 3, one embodiment of a several-bit dynamic comparator of the present invention is depicted. With particular reference to FIG. 3, three-bit dynamic comparator 300, for comparing first and second 3-bit words, A ($A_0$, $A_1$, $A_2$) and B ($B_0$, $B_1$, $B_2$), is depicted. Dynamic comparator 300 includes asynchronous XOR devices 302–306, precharge NOR circuit 310, and holder circuit 312. (XOR devices 302, 304, and 306 are not part of precharge NOR circuit 310 even though they are depicted within the dashed box.) Precharge NOR circuit 310 has a storage node S0 that discharges during an evaluate state if words A and B are not equal and stays charged if they are equal. Each XOR device 302, 304, 306, receives a separate comparative bit pair ($A_0/B_0$, $A_1/B_1$, $A_2/B_2$, respectively) from words A and B and is operably connected to precharge NOR circuit 310 to discharge the storage node if its received comparative bit pair has unequal bits. In the depicted embodiment, each XOR device produces a low value if its comparative pair has equal bits and produces a high value if its comparative bit pair bits are not equal. If none of the XOR devices has unequal comparative bit pair bits, then the storage node S0 remains charged indicating that the input words A and B are equal to one another. Conversely, if any of the comparative bit pairs have unequal bits, the storage node S0 discharges indicating that the input words are not equal. Inverting holder circuit 312 is connected to storage node, S0, in order to hold its charge during an evaluate state when it is suppose to evaluate high. It also provides an inverted output, $OUT_{M0}$, of the value at storage node S0. Thus, if words A and B are equal, circuit 300 outputs a low value during the evaluate state with the storage node, S0, being charged high. On the other hand, if they are not equal, it outputs a high value during the evaluate state with S0 being discharged.

Precharge NOR circuit 310 has input pull-down transistors Q32, Q33 and Q34, precharge transistor Q31, and DNG transistor Q35. In the depicted embodiment, pull down transistors Q32–Q34 and DNG transistor Q35 are NFET type transistors, and the precharge transistor is a PFET type transistor. The pull-down transistors are connected in parallel to a common charge storage node S0. The precharge transistor Q31 is also connected to the storage node S0. The DNG transistor Q35 is connected between ground and the sources of each pull-down transistor Q32–Q34. XOR devices 302, 304, and 306 are each connected at $XOR_0$, $XOR_1$, and $XOR_2$, respectively, as inputs to the gates of the three pull-down transistors, Q32, Q33, and Q34. During a precharge state, which for the depicted configuration occurs when the clock (CLK) signal is low, precharge transistor Q31 turns on and DNG transistor Q35 turns off. This causes the storage node, S0, to charge to a precharge (or high) level during the precharge state regardless of whether the pull down transistors, Q32–Q34, are turned off or on. During the evaluate state (when the CLK goes high), precharge transistor Q31 turns off and DNG transistor Q35 turns on. This allows storage node S0 to discharge if any of the pull-down transistors have turned on when the CLK transitions to the evaluate state. Thus, circuit 310 functions as a NOR circuit because if any input to a pull-down transistor gate is high, the storage node discharges thereby evaluating to a low value. S0 evaluates high only if every gate input to the pull-down transistors Q32–Q34 are inactive (low) during the evaluate state.

Inverting holder circuit 312 includes a holder transistor Q38 and an inverter formed from transistors Q36 and Q37. Transistors Q38 and Q36 are PFET type transistors, while transistor Q37 is an NFET type transistor. Transistors Q36 and Q37 are connected to one another in a conventional inverter configuration, with their gates connected to the storage node S0 and their drains defining the output, $OUT_{M0}$. Holder transistor Q38 is operably connected between VDD, the storage node S0, and output $OUT_{M0}$ so as to supply any additionally needed charge to the storage node S0 during the evaluate state when the storage node is to evaluate high (i.e., when the input words are equal). During the precharge state, S0 charges and eventually "trips" the inverter Q36/Q37 (and thereby holder circuit 312) once the voltage attains a predetermined precharge level. The predefined precharge (or "trip") level is determined by the relative conductivity of Q36 in proportion to Q37. As the ratio of conductivity between Q36 and Q37 goes higher, the trip level proportionately increases. In one embodiment of the present invention, it has been determined that a conductivity ratio of about 5:3 is desired. This ratio provides a relatively low trip level (as compared with many conventional designs), which decreases the necessary time for precharging the output at $OUT_{M0}$.

With reference to FIG. 2, one embodiment of asynchronous XOR device 200 is depicted. XOR device 200 generally includes passgates 202 and 204, connected to one another in a wired XOR configuration. Passgate 202 includes transistors Q21 and Q22, which are NFET and PFET type transistors, respectively. Similarly, passgate 204 includes transistors Q23 and Q24, which are also NFET and PFET type transistors, respectively. XOR device 200 is shown, with $A_0/B_0$ as the input comparative bit pair. The $A_0$ bit value is connected to the gate inputs of transistors Q21 and Q24, while the complementary $A_0$ bit value is connected to the gate inputs of transistors Q22 and Q23. The $B_0$ bit value is connected as an input to passgate 204 (i.e., at the Q24 drain and Q23 source), and the complementary value of bit $B_0$ is connected to the input of passgate 202 (i.e., Q22 drain and Q21 source). If the values of $A_0$ and $B_0$ are equal to one another, then a low value will be passed through to the output at $XOR_0$. If they are both high, then passgate 202 turns on, and passgate 204 turns off. The complement of $B_0$ (a low value) is then passed through passgate 202 to the output. Likewise if both bits were low, then passgate 202 would turn off, and passgate 204 would turn on, but this time $B_0$, which is low, passes through to the output at $XOR_0$. Conversely, if input bits $A_0$ and $B_0$ are not equal to one another, then a high value is passed through to the output at $XOR_0$. Again, only one of the passgates would turn on, and it will always pass a high value through to the output at $XOR_0$.

It should be recognized by persons of ordinary skill in the art that any suitable XOR device could be used for several-bit comparator circuit 300 of FIG. 3. For example, an XNOR device could be used with suitable signal conditioning at appropriate inputs. In addition, in the depicted XOR circuit of FIG. 2, it is assumed that both the bit and complementary bit values are available. However, it is clear that even if only the bit values (or complementary bit values) themselves were available, invertors could be incorporated into the depicted circuit to provide the necessary complementary (or non-complementary) inputs. Moreover, while FET passgates are used in a wired XOR configuration, any suitable circuit construct (e.g., wired XOR FETS)or gate devices could be utilized.

Figure 4:
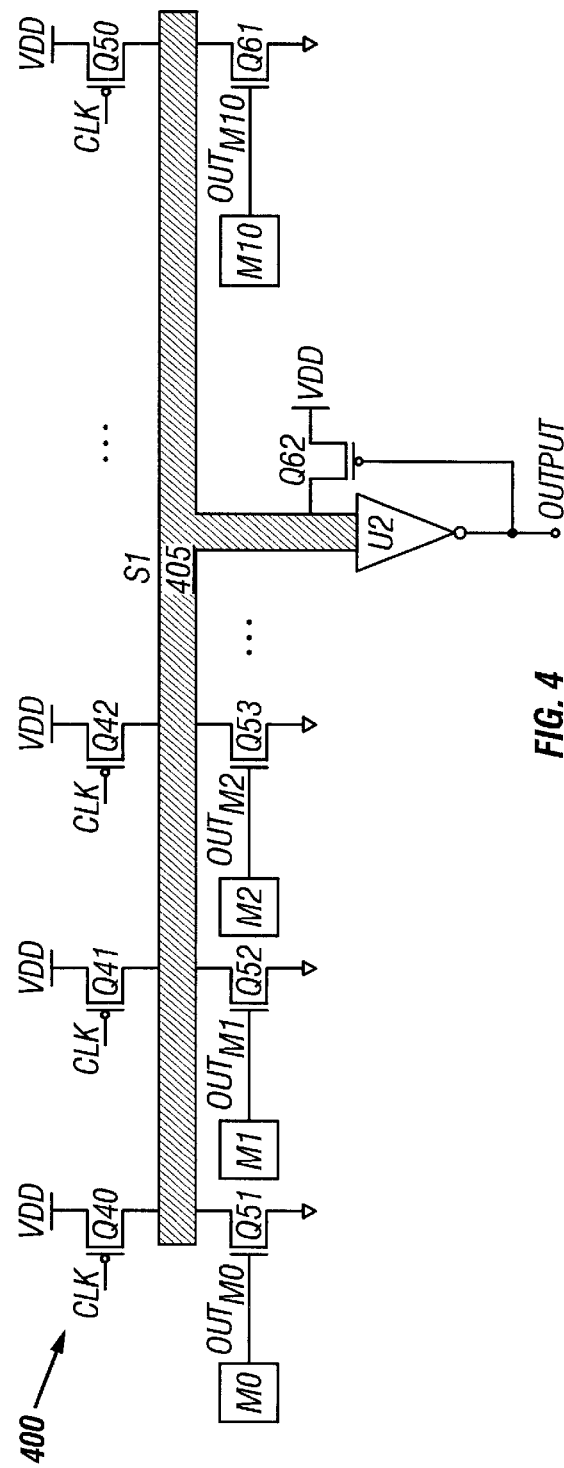
FIG. 4 is a circuit diagram of one embodiment of a multi-bit dynamic comparator of the present invention.

FIG. 4 shows one embodiment of multi-bit dynamic comparator 400 of the present invention. Depicted precharge multi-bit comparator 400 is a 33-bit comparator with 11 sub-stage comparators that are each 3-bit dynamic comparators. In general, multi-bit dynamic comparator 400 includes a multiple number (e.g., 11) of precharge transistors Q40 through Q50, the multiple number of pull-down transistors Q51 through Q61, the multiple number of sub-stage dynamic comparators M0 through M10, a charging transistor Q62, an inverter U2, and a storage node S1, which is formed from a longitudinal conductor 405. In the depicted embodiment, the precharge transistors Q40 through Q50 along with the charging transistor Q62, are PFET type transistors, while the pull-down transistors Q51 through Q61 are NFET type transistors.

Pull-down transistors Q51 through Q61 are configured substantially parallel to one another with their drains connected to the longitudinal conductor (S-1) 405. Likewise, precharge transistors Q40 through Q50 are connected through their drains to the storage node S1. Sub-stage dynamic comparators M0 through M10 are respectively connected to pull-down transistors Q51 through Q61, at their gate inputs. Inverter U2 has an input that is connected to storage node S1, and an output, OUTPUT, which is connected as an input to the gate of charging transistor Q62. Finally, the drain of charging transistor Q62 is connected to storage node S1.

Charging transistor Q62 and inverter U2 cooperate to function as an inverting holder circuit—similar to the holder circuit 312 of FIG. 3. Likewise, precharge transistors Q40–Q50, and pull-down transistors Q51–Q61 function as a precharge NOR circuit—similar to NOR circuit 310 of FIG. 3. This is so, even without one or more DNG transistors, when sub-stage comparators, M0–M10, are dynamic comparators with inactive precharge outputs. In such a case, DNG transistors are not needed because the inactive precharge outputs ensure pull-down transistors Q51–Q61 are off during the precharge state thereby allowing storage node S1 to precharge. If other sub-stage comparators (e.g., asynchronous) are used, DNG transistors may be required. In the depicted embodiment, sub-stage comparators M0 corresponds to several-bit dynamic comparator 300 from FIG. 3. Comparators M1 through M10 are implemented with similar dynamic comparators but with different appropriate inputs.

Conductive member 405, which is used for storage node S1, is relatively long, e.g., several thousand microns long. In one embodiment, instead of having pull-down transistors Q51–Q61, physically located next to one another, they are uniformly distributed along member 405. In this way, trace lengths from the outputs of the sub-stage comparators to the pull-down transistor gate inputs are substantially reduced, which speeds up the precharging of the circuit. In one embodiment, with the pull-down transistors distributed along the length of conductive member 405, a corresponding number of precharge transistors, Q40–Q50, similarly distributed, can be used rather than a single precharge transistor in order to more efficiently precharge the circuit. In addition, the holder circuit (inverter U2 and charging transistor Q62) can be physically connected proximal to the longitudinal center of conductive member 405 in order to minimize the maximum distance from the holder circuitry to any individual pull-down transistor. Moreover, because conductive member 405 is relatively long making it susceptible to electrical noise, it may be surrounded by supply and/or ground planes in order to effectively shield it.

What is claimed is:

1. A dynamic comparator circuit for comparing first and second words having one or more comparative bit pairs, comprising:
   one or more asynchronous XOR devices, each XOR device having inputs for receiving at least one of the comparative bit pairs from said first and second words and an output providing an XOR value that indicates whether any of the received comparative bit pairs has unequal bit values; and
   a precharge NOR circuit having one or more substantially parallel pull-down transistors connected between a common storage node and a DNG transistor, which turns off during a precharge phase, each of said pull-down transistors having an input coupled to the output of an associated separate one of the one or more asynchronous XOR devices for receiving its XOR value and discharging the storage node during an evaluate phase if the comparative word bit pairs input to its associated XOR device have unequal bit values, wherein the storage node evaluates to a charged value when all of the one or more comparative bit pairs have equivalent bits.

2. The circuit of claim 1 wherein the XOR device inputs comprise inputs for receiving first and second word bit and complementary first and second word bit values.

3. The circuit of claim 2 wherein the XOR devices each comprise a pair of pass gates coupled together in an asynchronous XOR configuration.

4. The circuit of claim 1 further comprising an inverting holder circuit having a holder input and a holder output, the holder input being coupled to the storage node, whereby the holder output provides an low output value when all of the one or more comparative pairs have equivalent first and second word bits.

5. The circuit of claim 4 wherein the holder circuit includes an inverter having an input corresponding to the holder input and an output corresponding to the holder output, the inverter input having a trip point that is less than half of the storage node voltage level when fully charged during a precharge state.

6. A multi-bit dynamic comparator circuit for comparing first and second words having a plurality of comparative bit pairs, each pair having comparative first and second word bits, comprising:
   a multiple number of precharge sub-stage comparators each having inputs for receiving one or more separate comparative bit pairs, and an output for providing a sub-stage output value that is inactive during a precharge state, active during an evaluate state if any of its received one or more comparative pairs has unequal bits, and inactive during the evaluate state if all of its received comparative bit pairs have equivalent bits, wherein the multiple number of received separate one or more bit pairs constitutes the plurality of comparative bit pairs, whereby all of the sub-stage comparators operably output the inactive value during the evaluate state when the first and second words are equal; and
   a precharge NOR circuit having the multiple number of substantially parallel pull-down transistors connected to a common multi-bit comparator storage node, each of said pull-down transistors having an input coupled to the output of an associated separate one of the multiple number of sub-stage comparators for receiving its sub-stage output value, wherein the multi-bit comparator storage node charges to a precharge level during the precharge state, discharges during an evaluate state if any of the sub-stage output values is active during the evaluate state, and remains substantially charged during the evaluate state if all of the sub-stage output values remain inactive during the evaluate state;
   the multi-bit comparator storage node including a longitudinal conductive member, the multiple number of pull-down transistors being coupled to and substantially uniformly distributed along said conductive member with each of said pull-down transistors being substantially proximal to its associated sub-stage comparator.

7. The multi-bit comparator circuit of claim 6 further comprising an inverting holder circuit having an input connected to the multi-bit comparator storage node substantially proximal to the longitudinal center of the conductive member.

8. The multi-bit comparator circuit of claim 6 further comprising one or more precharge transistors operably connected to the multi-bit comparator storage node and substantially uniformly distributed along the longitudinal conductive member.

9. The multi-bit comparator circuit of claim 8 wherein the one or more precharge transistors includes the multiple number of precharge transistors with each of said multiple number of precharge transistors being connected to the conductive member substantially proximal to a separate one of the multiple number of pull-down transistors.

10. The multi-bit comparator circuit of claim 6 wherein the multiple number of sub-stage comparators each comprise one or more asynchronous XOR devices each having inputs for receiving a separate one of the one or more comparative bit pairs and an output for providing an inactive value when its comparative bit pair has equal bits and an active value when its comparative bit pair has unequal bits.

11. The multi-bit comparator circuit of claim 10 wherein each sub-stage comparator has one or more pull-down transistors for operably coupling the asynchronous XOR devices to a common sub-stage storage node, wherein said sub-stage storage node remains charged during the evaluate state if all of its XOR devices output inactive values and discharges during the evaluate state if any of its XOR devices outputs an active value during the evaluate state.

12. The multi-bit comparator circuit of claim 6 wherein the multiple number of pull-down transistors are operably connected to a ground for discharging the multi-bit storage node if any of the sub-stage comparators outputs an active value during the evaluate state.

13. A multi-bit dynamic comparator circuit for comparing first and second words having a plurality of comparative bit pairs, each pair having comparative first and second word bits, comprising:
- a multiple number of precharge sub-stage comparators each having inputs for receiving one or more separate comparative bit pairs and an output for operably providing an output value that is inactive during a precharge state, active during an evaluate state if any of its received one or more comparative pairs has unequal first and second word bits, and inactive during an evaluate state if all of its received comparative bit pairs have equivalent first and second word bits, wherein the multiple number of received separate one or more bit pairs constitutes the plurality of comparative bit pairs, whereby all of the sub-stage comparators operably output the inactive value during the evaluate state when the first word is equal to the second word; and
- a NOR circuit having the multiple number of substantially parallel pull-down transistors connected to a common multi-bit comparator storage node, each of said pull-down transistors having an input coupled to the output of an associated separate one of the multiple number of sub-stage comparators for receiving its output value, wherein the multi-bit comparator storage node charges to a precharge level during the precharge state, discharges during an evaluate state if any of the sub-stage output values are active during the evaluate state, and remains substantially charged to the precharge level during the evaluate state if all of the output values remain inactive during the evaluate state thereby indicating that the first and second words are equal to one another;
- the multi-bit comparator storage node including a longitudinal conductive member, the multiple number of pull-down transistors being substantially uniformly distributed along said conductive member with each transistor being proximal to its associated sub-stage comparator.

14. The multi-bit comparator circuit of claim 13 further comprising an inverting holder circuit having an input connected to the multi-bit comparator storage node substantially proximal to the longitudinal center of the conductive member.

15. The multi-bit comparator circuit of claim 13 further comprising one or more precharge transistors operably connected to the multi-bit comparator storage node and substantially uniformly distributed along the longitudinal conductive member.

16. The multi-bit comparator circuit of claim 15 wherein the one or more precharge transistors includes the multiple number of precharge transistors with each of said multiple number of precharge transistors being connected to the conductive member substantially proximal to a separate one of the multiple number of pull-down transistors.

17. The multi-bit comparator circuit of claim 13 wherein the multiple number of sub-stage comparators each comprise one or more asynchronous XOR devices each having inputs for receiving a separate one of the one or more comparative bit pairs and an output for providing an inactive value when its comparative bit pair has equal bits and an active value when its comparative bit pair has unequal bits.

18. The multi-bit comparator circuit of claim 17 wherein each sub-stage comparator has one or more pull-down transistors for operably coupling the asynchronous XOR devices to a common sub-stage storage node, wherein said sub-stage storage node remains charged during the evaluate state if all of its XOR devices output inactive values and discharges during the evaluate state if any of its XOR devices outputs an active value during the evaluate state.

19. The multi-bit comparator circuit of claim 13 wherein the multiple number of pull-down transistors are operably connected to a ground for discharging the multi-bit storage node if any of the sub-stage comparators outputs an active value during the evaluate state.

20. A multi-bit dynamic comparator circuit for comparing first and second words having a plurality of comparative bit pairs, each pair having comparative first and second word bits, comprising:
- a multiple number of precharge sub-stage comparators each having inputs for receiving one or more separate comparative bit pairs and an output for operably providing an output value that is inactive during a precharge state, active during an evaluate state if any of its received one or more comparative pairs has unequal first and second word bits, and inactive during an evaluate state if all of its received comparative bit pairs have equivalent first and second word bits, wherein the multiple number of received separate one or more bit pairs constitutes the plurality of comparative bit pairs, whereby all of the sub-stage comparators operably output the inactive value during the evaluate state when the first word is equal to the second word; and
- a NOR circuit having the multiple number of substantially parallel pull-down transistors connected to a common multi-bit comparator storage node, each of said pull-down transistors having an input coupled to the output of an associated separate one of the multiple number of sub-stage comparators for receiving its output value, wherein the multi-bit comparator storage node charges to a precharge level during the precharge state, discharges during an evaluate state if any of the sub-stage output values are active during the evaluate state, and remains substantially charged to the precharge level during the evaluate state if all of the sub-stage comparator output values remain inactive during the evaluate state thereby indicating that the first and second words are equal to one another;
- the multiple number of sub-stage comparators each having one or more asynchronous XOR devices each having inputs for receiving a separate one of the one or more comparative bit pairs and an output for providing an inactive value within its sub-stage comparator when its comparative bit pair has equal bits and an active value when its comparative bit pair has unequal bits.

21. The multi-bit comparator circuit of claim 20 wherein each sub-stage comparator has one or more pull-down transistors for operably coupling the asynchronous XOR devices to a common sub-stage storage node, wherein said sub-stage storage node remains charged during the evaluate state if all of its XOR devices output inactive values and discharges during the evaluate state if any of its XOR devices outputs an active value during the evaluate state.

22. The multi-bit comparator circuit of claim 21 wherein the multiple number of pull-down transistors are operably connected to a ground for discharging the multi-bit storage node if any of the sub-stage comparators outputs an active value during the evaluate state.

23. The multi-bit comparator circuit of claim 20 wherein the multi-bit comparator storage node includes a longitudinal conductive member, the multiple number of pull-down transistors being substantially uniformly distributed along said conductive member with each transistor being proximal to its associated sub-stage comparator.

24. The multi-bit comparator circuit of claim 23 further comprising an inverting holder circuit having an input connected to the multi-bit comparator storage node substantially proximal to the longitudinal center of the conductive member.

25. The multi-bit comparator circuit of claim 20 further comprising one or more precharge transistors operably connected to the multi-bit comparator storage node and substantially uniformly distributed along the longitudinal conductive member.

26. The multi-bit comparator circuit of claim 25 wherein the one or more precharge transistors includes the multiple number of precharge transistors with each of said multiple number of precharge transistors being connected to the conductive member substantially proximal to a separate one of the multiple number of pull-down transistors.

27. The multi-bit comparator circuit of claim 20 wherein said pull-down transistors are implemented with NFET transistors.

* * * * *